US009517741B2

United States Patent
Watterworth et al.

(10) Patent No.: US 9,517,741 B2
(45) Date of Patent: Dec. 13, 2016

(54) WHEEL DEFLECTOR BRACKET AND METHOD

(71) Applicant: GM GLOBAL TECHNOLOGY OPERATIONS LLC, Detroit, MI (US)

(72) Inventors: Eric A. Watterworth, Orion, MI (US); Dominic S. Pupillo, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 14/323,075

(22) Filed: Jul. 3, 2014

(65) Prior Publication Data

US 2016/0001727 A1    Jan. 7, 2016

(51) Int. Cl.
| | |
|---|---|
| *B60J 5/00* | (2006.01) |
| *B60R 19/54* | (2006.01) |
| *B62D 21/15* | (2006.01) |
| *B62D 25/04* | (2006.01) |
| *B60R 19/00* | (2006.01) |

(52) U.S. Cl.
CPC ............ *B60R 19/54* (2013.01); *B62D 21/15* (2013.01); *B62D 21/152* (2013.01); *B62D 25/04* (2013.01); *B60R 2019/007* (2013.01)

(58) Field of Classification Search
CPC .............................. B60J 5/0427; B60J 5/0431
USPC ............ 280/784; 296/146.6, 187.09, 187.12
See application file for complete search history.

(56) References Cited

U.S. PATENT DOCUMENTS

| | | | | | |
|---|---|---|---|---|---|
| 6,866,115 | B2 * | 3/2005 | Miyasaka | ............... | B60R 19/00 180/311 |
| 8,215,706 | B2 * | 7/2012 | Ohta | ...................... | B60J 5/0427 296/146.6 |
| 8,382,195 | B2 * | 2/2013 | Iwase | ................... | B62D 25/025 296/187.12 |
| 8,585,134 | B2 * | 11/2013 | Yasui | ................... | B62D 21/152 296/204 |
| 8,596,711 | B2 * | 12/2013 | Yasui | ..................... | B60R 19/34 296/187.09 |
| 8,985,258 | B1 * | 3/2015 | Midoun | ............... | B62D 25/082 180/274 |
| 8,985,681 | B2 * | 3/2015 | Fujii | .................. | B62D 25/2036 296/204 |
| 9,010,845 | B1 * | 4/2015 | Ramoutar | ............... | B60R 19/14 293/155 |
| 9,139,170 | B2 * | 9/2015 | Albertson | ................. | B60T 7/10 |
| 2003/0102697 | A1 * | 6/2003 | Yakata | .................. | B62D 25/02 296/209 |
| 2005/0011640 | A1 * | 1/2005 | Tohda | ................ | B60H 1/00007 165/202 |
| 2012/0248825 | A1 * | 10/2012 | Tamura | .................. | B62D 25/04 296/209 |

* cited by examiner

*Primary Examiner* — Toan To
(74) *Attorney, Agent, or Firm* — Quinn Law Group, PLLC

(57) ABSTRACT

A vehicle wheel deflector bracket and method is provided. The bracket is attachable to a vehicle having a wheel, a door, and a body structure supporting a door hinge. The bracket is configured to deflect a force from the wheel to the body structure and away from the door hinge when the bracket is attached to the body structure.

19 Claims, 2 Drawing Sheets

WHEEL DEFLECTOR BRACKET AND METHOD

TECHNICAL FIELD

This disclosure for a vehicle relates to a wheel deflector bracket for deflecting force away from a door hinge on a vehicle body structure.

BACKGROUND

Vehicles may be subject to an external force event. It may be beneficial to deflect a vehicle wheel force that may result from such an event to an area of the vehicle body structure away from a door hinge.

SUMMARY

A vehicle wheel deflector bracket is provided. The bracket is attachable to a vehicle having a wheel, a door, and a body structure supporting a door hinge. The bracket is configured to deflect a force from the wheel to the body structure and away from the door hinge when the bracket is attached to the body structure.

A vehicle is also provided. The vehicle includes a wheel, a door, and a body structure having a door hinge for hingedly supporting the door on the body structure. The door hinge is subjectable to a vehicle wheel force from a vehicle external force event. The vehicle has a bracket between the wheel and the door hinge. The bracket is sufficiently configured and attached to the body structure so that the wheel is deflected from striking the door hinge during such vehicle external force event.

A method to deflect a force from a wheel of a vehicle having a body structure, a door, and a door hinge, toward the body structure and away from the door hinge is also provided. The method includes sufficiently configuring a force deflecting bracket to at least extend outboard of the body structure forward of the door hinge and attaching the force deflecting bracket to the body structure so that the wheel is deflected from striking the door hinge by the force deflecting bracket.

The provided wheel deflector bracket, vehicle, and method enable deflection of a vehicle wheel force that may result from a vehicle external force event to the vehicle body structure and away from the door hinge.

The above features and advantages and other features and advantages of the present teachings are readily apparent from the following detailed description of the best modes for carrying out the present teachings when taken in connection with the accompanying drawings.

DETAILED DESCRIPTION

Figure 1:
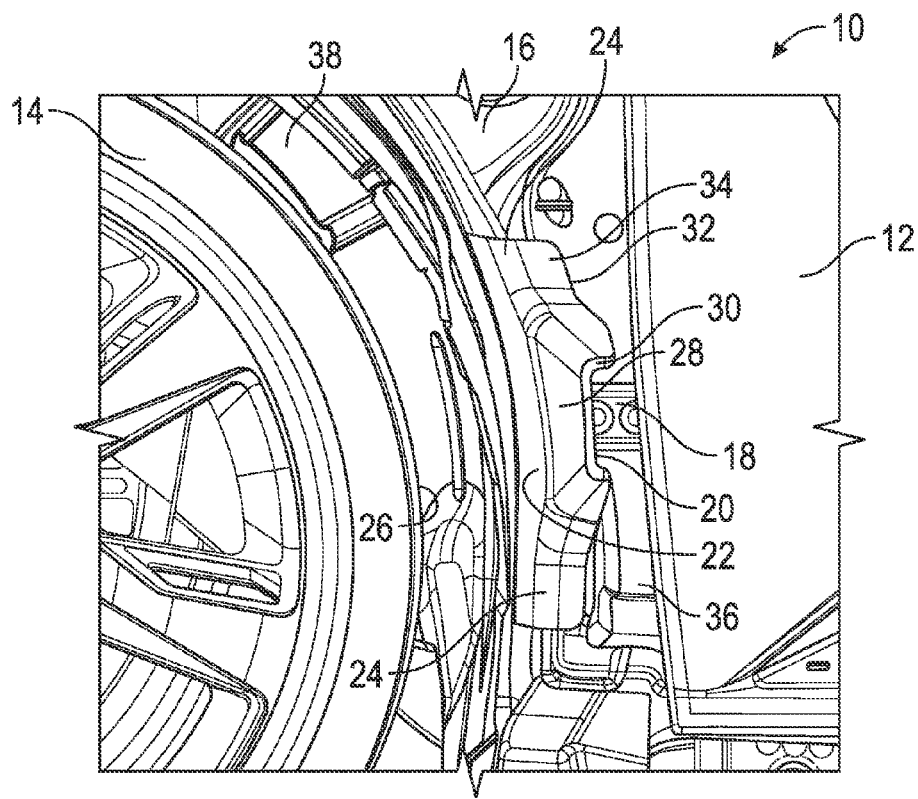
FIG. 1 is a fragmentary schematic perspective illustration of a vehicle having a wheel, a wheel liner, and a wheel deflector bracket attached to a vehicle body structure which supports a vehicle door hinge.

Referring to the drawings, wherein like reference numbers refer to like components throughout the views, FIG. 1 shows a vehicle 10 that may be subject to a vehicle external force event. The vehicle 10 has a door 12, a wheel 14, a body structure 16, and a wheel deflector bracket 20. The body structure 16 includes a door hinge 18 for hingedly supporting the door 12 on the vehicle 10. Potentially, the door hinge 18 may be subject to a wheel force resulting from the vehicle external force event.

The wheel deflector bracket 20 is attached to the body structure 16 and is disposed between the wheel 14 and the door hinge 18. The wheel deflector bracket 20 is sufficiently configured and attached to the body structure 16 to deflect the wheel force resulting from the vehicle external force event from the wheel 14 to the body structure 16 and away from the door hinge 18. The wheel deflector bracket 20 may be sufficiently configured and attached to the body structure 16 so that the wheel 14 is deflected from striking the door hinge 18 during the vehicle external force event.

The body structure 16 may include a hinge pillar 36. The wheel deflector bracket 20 may be attached to the hinge pillar 36. The wheel deflector bracket 20 may be made of steel or of any other suitable structural material. The vehicle 10 may also include a wheel liner 38, disposed between the wheel 14 and the body structure 16. The wheel deflector bracket 20 may be disposed between the wheel liner 38 and the door hinge 18.

The wheel deflector bracket 20 may include a wheel contact surface portion 22 and a body structure attachment portion 24. The wheel 14 may have an outer surface portion 26. The wheel contact surface portion 22 may be configured to cooperate with the outer surface portion 26 of the wheel 14. For example, the shape of the wheel contact surface portion 22 may be configured to sufficiently match the shape of the wheel outer surface portion 26. The body structure attachment portion 24 may include any portion of the wheel deflector bracket 20 in contact with or in close attachable proximity to the body structure 16. The body structure attachment portion 24 may include all or part of the wheel contact surface portion 22.

The body structure attachment portion 24 may be configured to facilitate welding of the wheel deflector bracket 20 to the body structure 16. Welding methods may include, but are not limited to, resistance spot welding, arc welding, and laser welding. The body structure attachment portion 24 may also be configured to facilitate fastening of the wheel deflector bracket 20 to the body structure 16. Fastening methods may include, but are not limited to, bolting, riveting, adhesive bonding, and screwing.

Figure 3:
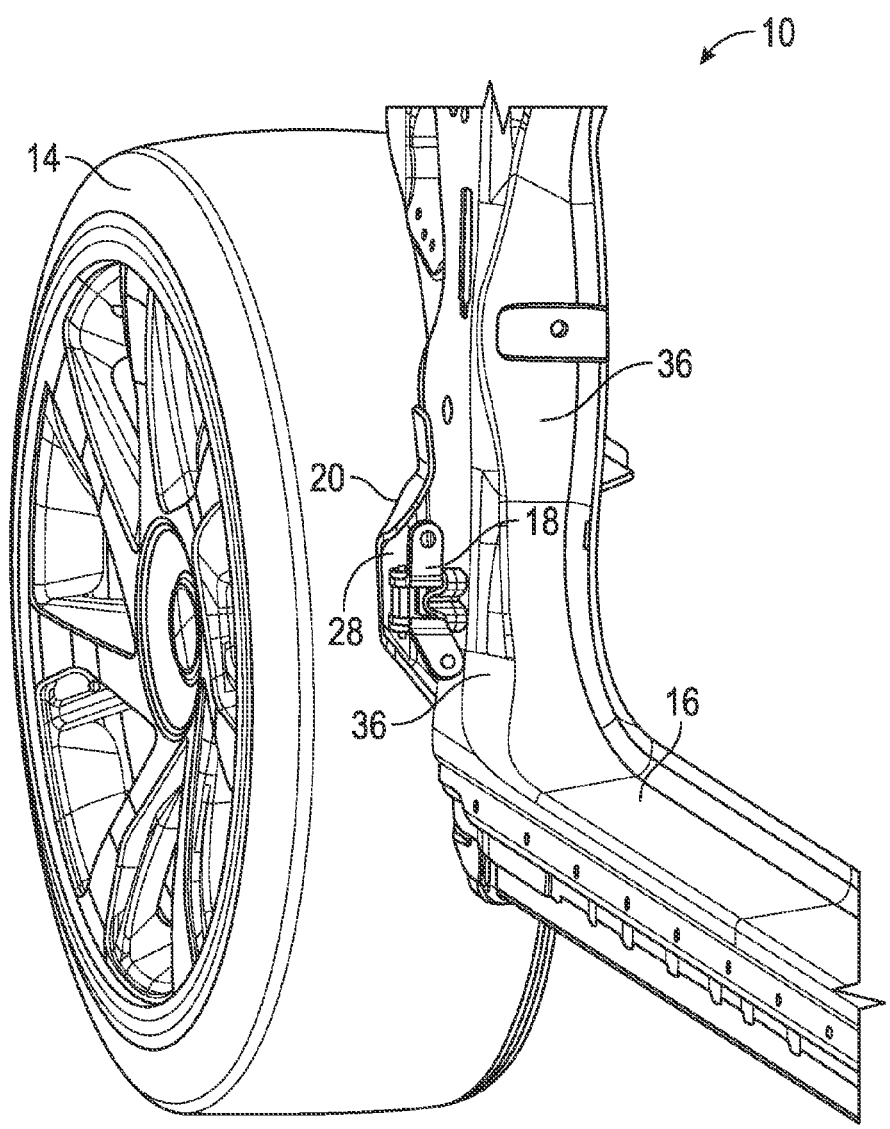
FIG. 3 is another fragmentary schematic perspective illustration of the vehicle of FIG. 1 with the door and the wheel liner removed for clarity.

The wheel deflector bracket 20 may also include a hinge cover portion 28. The hinge cover portion 28 may be configured to extend outboard of the body structure 16 forward of the door hinge 18, as best seen in FIG. 3. Outboard is defined as a direction perpendicular to the direction of vehicle 10 travel, parallel to the ground, and away from the centerline of the vehicle 10. Forward of is defined as in a position closer to the front of the vehicle 10.

Returning now to FIG. 1, a cross-section 30 of the hinge cover portion 28 may be U-shaped. The bottom of the U-shape may be toward the front of the vehicle 10. The cross-section 30 of the hinge cover portion 28 may also be any other suitable shape including, but not limited to, an I-shape, a C-shape, an L-shape, or a hat-shape.

The wheel deflector bracket 20 may also include a structural feature 32. The structural feature 32 may be a flange 34, or any other feature suitable for enhancing the structural performance of the wheel deflector bracket 20.

Figure 2:
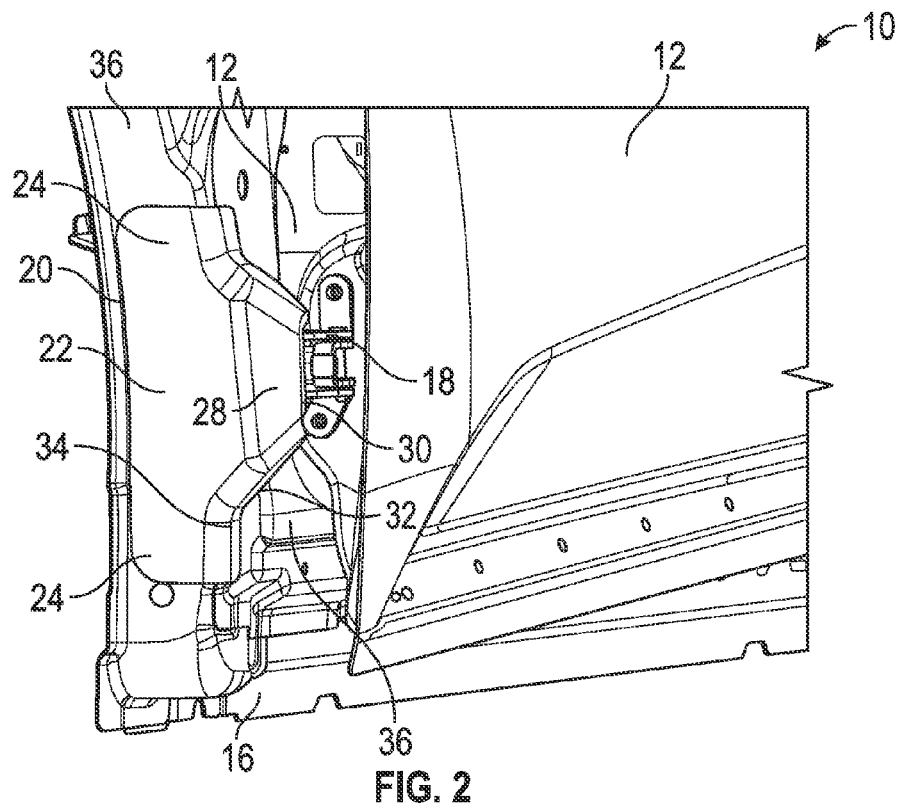
FIG. 2 is a fragmentary schematic perspective illustration of the vehicle of FIG. 1 with the wheel and wheel liner removed for clarity.

FIGS. 2 and 3 are included to provide additional views of the wheel deflector bracket 20 relative to the body structure 16 and the door hinge 18 for clarity. Other suitable structural configurations of the wheel deflector bracket 20 may also be used.

Figure 4:
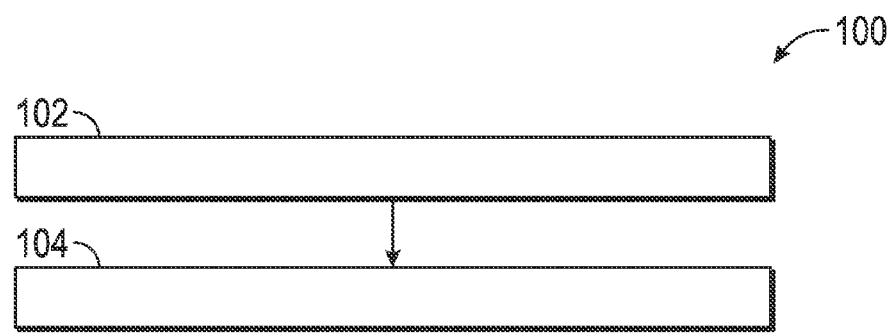
FIG. 4 is a flow chart of a method to deflect a force from a vehicle wheel to a vehicle body structure and away from a vehicle door hinge.

Referring now to FIG. 4, a method 100 to deflect a force from a wheel 14 of a vehicle 10 having a body structure 16, a door 12, and a door hinge 18, toward the body structure 16 and away from the door hinge 18 is shown. The method 100 includes sufficiently configuring 102 a force deflecting bracket 20 to at least extend outboard of the body structure 16 forward of the door hinge 18 and attaching 104 the force deflecting bracket 20 to the body structure 16 so that the wheel 14 is deflected from striking the door hinge 18 by the force deflecting bracket 20.

Sufficiently configuring 102 the force deflecting bracket 20 may include, but is not limited to, selecting a material, selecting a shape, selecting a thickness, selecting a wheel contact surface portion 22, selecting a body structure attachment portion 24, selecting a hinge cover portion 28 in coordination with the wheel contact surface portion 22 selection, and selecting a structural feature 32. Attaching 104 the force deflection bracket 20 may include, but is not limited to spot welding, arc welding, laser welding, bolting, riveting, adhesive bonding, and screwing.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle wheel deflector for a vehicle having a wheel, a door, and a body structure supporting a door hinge, comprising:
a bracket attachable to the body structure and configured to deflect a force from the wheel to the body structure and away from the door hinge when the bracket is attached to the body structure;
wherein the bracket is not connected to the door hinge so that none of the force from the wheel is applied to the door hinge.

2. The vehicle wheel deflector of claim 1, wherein the bracket includes a wheel contact surface portion; and a body structure attachment portion.

3. The vehicle wheel deflector of claim 2, wherein the wheel has an outer surface portion; and wherein the wheel contact surface portion of the bracket is configured to cooperate with the outer surface portion of the wheel.

4. The vehicle wheel deflector of claim 2, wherein the body structure attachment portion is configured to facilitate welding of the bracket to the body structure.

5. The vehicle wheel deflector of claim 2, wherein the body structure attachment portion is configured to facilitate fastening of the bracket to the body structure.

6. The vehicle wheel deflector of claim 2, further comprising a hinge cover portion, wherein the hinge cover portion is configured to extend outboard of the body structure forward of the door hinge.

7. The vehicle wheel deflector of claim 6, wherein the hinge cover portion has a U-shaped cross-section.

8. The vehicle wheel deflector of claim 2, further comprising a structural feature.

9. The vehicle wheel deflector of claim 8, wherein the structural feature is a flange.

10. A vehicle subject to a vehicle external force event and having a wheel, a door, and a body structure including a door hinge for hingedly supporting the door on the body structure, the vehicle comprising:
a bracket disposed between the wheel and the door hinge, attached to the body structure, and configured to deflect a force from the wheel to the body structure and away from the door hinge during such vehicle external force event;
wherein the bracket is not connected to the door hinge so that none of the force from the wheel is applied to the door hinge.

11. The vehicle of claim 10, wherein the bracket has a wheel contact surface portion and a body structure attachment portion.

12. The vehicle of claim 11, wherein the wheel has an outer surface portion; and wherein the wheel contact surface portion of the bracket is configured to cooperate with the outer surface portion of the wheel.

13. The vehicle of claim 11, wherein the body structure attachment portion is configured to facilitate welding of the bracket to the body structure.

14. The vehicle of claim 11, wherein the body structure attachment portion is configured to facilitate fastening of the bracket to the body structure.

15. The vehicle of claim 11, wherein the bracket has a hinge cover portion; and wherein the hinge cover portion is configured to extend outboard of the body structure forward of the door hinge.

16. The vehicle of claim 15, wherein the hinge cover portion has a U-shaped cross-section.

17. The vehicle of claim 11, wherein the bracket has a structural feature.

18. The vehicle of claim 17, wherein the structural feature is a flange.

19. A method to deflect a force from a wheel of a vehicle having a body structure, a door, and a door hinge, toward the body structure and away from the door hinge, comprising:
sufficiently configuring a force deflecting bracket to at least extend outboard of the body structure forward of the door hinge; and
attaching the force deflecting bracket to the body structure such that the force deflecting bracket is not connected to the door hinge so that the force from the wheel is deflected to the body structure and away from the door hinge by the force deflecting bracket and none of the force from the wheel is applied to the door hinge.

* * * * *